United States Patent
Goubard

(10) Patent No.: US 8,980,981 B2
(45) Date of Patent: Mar. 17, 2015

(54) HOT-MELT ADHESIVE COMPOSITION INTENDED TO FORM A FILM SUITABLE FOR WRAPPING A HOT-MELT ADHESIVE PRODUCT, AND ITS USE

(71) Applicant: Bostik SA, La Plaine St Denis Cedex (FR)

(72) Inventor: David Goubard, Compiegne (FR)

(73) Assignee: Bostik SA, La Plaine St Denis Cedex (FR)

( * ) Notice: Subject to any disclaimer, the term of this patent is extended or adjusted under 35 U.S.C. 154(b) by 134 days.

(21) Appl. No.: 13/726,877

(22) Filed: Dec. 26, 2012

(65) Prior Publication Data

US 2013/0165568 A1    Jun. 27, 2013

(30) Foreign Application Priority Data

Dec. 26, 2011 (FR) .................... 11 62452

(51) Int. Cl.
| | | |
|---|---|---|
| C09J 153/02 | (2006.01) | |
| C09J 145/00 | (2006.01) | |
| C09J 125/16 | (2006.01) | |
| C09J 191/06 | (2006.01) | |
| C09J 123/06 | (2006.01) | |
| C09J 7/00 | (2006.01) | |
| B65D 65/46 | (2006.01) | |
| B65B 63/08 | (2006.01) | |
| C08J 5/18 | (2006.01) | |
| C08L 91/06 | (2006.01) | |

(52) U.S. Cl.
CPC .............. *C09J 153/02* (2013.01); *B65D 65/46* (2013.01); *B65B 63/08* (2013.01); *C08J 5/18* (2013.01); *C09J 7/00* (2013.01); *C09J 153/025* (2013.01); *C09J 125/16* (2013.01); *C08L 91/06* (2013.01); *C08L 2203/162* (2013.01); *C08L 2205/035* (2013.01); *C08L 2205/06* (2013.01)
USPC .......................................... 524/210; 524/505

(58) Field of Classification Search
CPC .............. C08L 91/16; C08L 2203/162; C08L 2205/035; C08L 225/06
USPC .................................................. 524/210, 505
See application file for complete search history.

(56) References Cited

U.S. PATENT DOCUMENTS

| 7,328,547 B2 * | 2/2008 | Mehta et al. .................... 53/428 |
| 2006/0075723 A1 | 4/2006 | Burriez et al. |
| 2006/0093764 A1 | 5/2006 | Mehta et al. |
| 2006/0199897 A1 * | 9/2006 | Karjala et al. ................. 524/543 |
| 2008/0118689 A1 | 5/2008 | Mehta et al. |

FOREIGN PATENT DOCUMENTS

| WO | WO 2006/040194 A1 | 4/2006 |
| WO | WO 2006/050108 A1 | 5/2006 |

* cited by examiner

*Primary Examiner* — Kelechi Egwim
(74) *Attorney, Agent, or Firm* — Millen, White, Zelano & Branigan, P.C.

(57) ABSTRACT

A hot-melt adhesive composition intended to form a film:
  a) from 20 to 60% by weight of a styrene block copolymer;
  b) from 5 to 50% by weight of a particular tackifying resin;
  c) from 10 to 40% of a Fischer-Tropsch type wax; and
  d) from 1 to 30% of a polyethylene wax and/or at least one polyolefin polymerized by metallocene catalysis;
  said composition having a Brookfield viscosity at 180° C. from 3,000 to 70,000 mPa·s, a softening point of 80 at 130° C., and a modulus of elasticity at 60° C. of $2 \times 10^5$ to $10^8$ Pa.

A film for hot-melt adhesive product constituted by a hot-melt adhesive material of such a composition. A ready-to-use hot-melt adhesive product and its production, said hot-melt adhesive product having a coating constituted by such a film.

15 Claims, No Drawings

HOT-MELT ADHESIVE COMPOSITION INTENDED TO FORM A FILM SUITABLE FOR WRAPPING A HOT-MELT ADHESIVE PRODUCT, AND ITS USE

The invention relates to an adhesive composition intended to form a film suitable for wrapping a hot-melt adhesive product. In particular, the present invention relates to an adhesive composition intended to form a film for wrapping a ready-to-use hot-melt adhesive product, more particularly in the case where the products thus wrapped are produced by a co-extrusion process.

Hot-melt adhesive products are generally solid at ambient temperature, but are applied in a molten, or at least semi-rigid, state. These hot-melt adhesive products are generally supplied in the form of solid blocks or pellets, generally in drums or in sachets, usually substantially cylindrical in shape. These sachets (or pillows), typically weighing in the range from approximately 35 g to approximately 2 kg, are difficult to handle and store, as hot-melt adhesive products and more particularly HMPSA ("hot-melt pressure sensitive adhesives"), are very sticky and/or soft at ambient temperature.

Thus adhesive compositions have been developed suitable for forming films which wrap these sachets, not only for ease of handling and storage, but also for protecting them from their environment. These films, which form a sort of "skin" around the sachet, are generally formed around the sachet by co-extrusion at the time of formation of the sachet. During the use of the sachet, the film which wraps it is melted at the same time as the hot-melt adhesive product. In fact, the presence of a low percentage by weight of the film composition in the wrapped sachet theoretically makes it possible, during melting, to obtain a substantially homogeneous material that is fit for purpose.

Unfortunately, hot-melt adhesive compositions developed for forming films around these sachets currently give rise to problems of compatibility with the chemical bases of the sachet material and/or performance over time. Thus, during storage, the mobile constituents of low molecular weight present in the sachet material tend to migrate through the skin to generate caking, or the skin becomes so hard that it cracks, forms fissures and no longer performs its barrier function.

Moreover, these adhesive compositions also give rise to problems of a drop in application performance estimated at the rate of 10 to 30%, as the melting of the sachet results in a substantially heterogeneous material.

Patent Application WO 2006/050108 describes a process for packaging a plastic material, such as a hot-melt adhesive product constituted by a hot-melt adhesive material, said process comprising the production of a film wrapping this material, said film being co-extruded around the material during its formation. Such a polymer film polymer comprises at least 25% wax by weight, has an enthalpy of fusion of at least 100 J/g, as well as an ultimate elongation value of at least 100%. Such a film is produced by mixing a suitable quantity of partially crystalline ethylene-based polymer with a thermoplastic elastomeric block copolymer and/or a propylene- or ethylene-based elastomer.

Unfortunately, the adhesive composition suitable for forming a film as described in said document, although it generally has a good thermomechanical behaviour, (during the production process and during storage), can crack under certain storage and transport conditions.

By "wrapping" or "coating", is generally meant totally covering the outer surfaces. By "hot-melt", is generally meant suitable for melting at a temperature usually of at least 50° C.

Thus, to date, there is no adhesive composition allowing a hot-melt adhesive material to be coated and fulfilling all the industrial requirements as stated above.

A subject of the present invention is to propose a novel adhesive composition solving the problems of the prior art.

The adhesive composition according to the invention is an adhesive composition intended to form a film, the composition comprising, by weight with respect to the total weight of the composition:

a) from 20 to 60% of at least one styrene block copolymer, generally chosen from the group formed by the triblock copolymers of formula A-B-A in which A represents a non-elastomeric styrene block (or polystyrene) and B represents a totally or partially hydrogenated polybutadiene elastomeric block, the diblock copolymers of formula A-B in which A and B are as defined previously, and their mixtures;

b) from 5 to 55% of at least one tackifying resin having a number-average molecular weight comprised between 200 Da and 10 kDa (determined by gel permeation chromatography—GPC—with polystyrene standard), and chosen from the group formed by the resins capable of being obtained:
  i) by hydrogenation, polymerization or copolymerization (with or without aromatic hydrocarbon) from mixtures of unsaturated aliphatic hydrocarbons having approximately 5 or 9 carbon atoms, and originating from petroleum cuts, and
  ii) by polymerisation of terpene hydrocarbons in the presence of Friedel-Crafts catalysts, and
  iii) by polymerization, followed optionally by at least partial hydrogenation, of alpha methylstyrene units and optionally styrene;

c) from 10 to 40% of at least one wax having a melting point from 75 to 125° C. and a number-average molecular weight from 500 to 1500 Da (determined by gel permeation chromatography—GPC—with polystyrene standard); and d) from 1 to 30% of at least one constituent chosen from polyethylene waxes and polyolefins polymerized by metallocene catalysis;

said composition having a Brookfield viscosity at 180° C. comprised within a range from 3,000 to 70,000 mPa·s, a softening point comprised within a range from 80 to 130° C., and a modulus of elasticity at 60° C., comprised within a range from $2\times10^5$ to $10^8$ Pa, as measured by rheological scanning test at a temperature from 150° C. to 10° C. at 10° C./min and at the constant oscillation frequency of 10 rad/s.

The viscosity of the composition according to the invention at 180° C. is comprised within a range from 3,000 to 70,000 mPa·s, preferably from 3,500 to 40,000. The viscosity is measured by Brookfield viscosity according to the ASTM D 3236 method. This viscosity can be measured by using a Thermosel Brookfield device or any other suitable viscosimeter, and by using the test techniques as they are described in said ASTM method.

The "Ring and Ball softening point" of the adhesive composition according to the invention is comprised within a range from 80 to 130° C., preferably from 90 to 120° C. This point is determined according to the ASTM E-28 method, usually by using a Herzog automatic unit.

The rheological scanning test at a temperature of 150 to 10° C. at 10° C./min, and at the constant oscillation frequency of 10 rad/s, makes it possible to measure the modulus of elasticity G' at 60° C. of the composition according to the invention which is generally comprised within a range from $2\times10^5$ to $10^8$ Pa, preferably from $2\times10^5$ to $10^7$ Pa.

The intersection point of the moduli of elasticity G' and viscosity G" of the composition according to the invention, by this same rheological scanning test at a temperature of 150 to 10° C. at 10° C./min and at the constant oscillation frequency of 10 rad/s, is preferably comprised within a range from 70 to 100° C. The intersection point of the moduli of elasticity and viscosity is determined on a rheogram giving the evolution of the modulus of elasticity G' (in Pa) as a function of the temperature, and the evolution of the modulus of viscosity G" (in Pa) as a function of the temperature, on the same scales: this is the point of intersection of these two curves. By evolution is meant a set of discontinuous measurement points.

The adhesive composition according to the invention has moreover, preferably, an enthalpy of fusion DSC comprised within a range from 40 to 100 J/g. By DSC is meant, as is well known to a person skilled in the art <<Differential Scanning Calorimetry>>. The DSC test method is carried out according to standard ASTM D-3417, at scanning rates of 20° C./min on a standard instrument such as the DSC instrument model 2010 appliance from TA instruments. Three temperature ramps are carried out consecutively on a sample of 5 to 10 mg, under a nitrogen atmosphere at a temperature from −100° C. to 200° C., then from 200° C. to −100° C., then again from −100° C. to 200° C. The last scanning gives the reproductive measurement of the enthalpy of fusion of the composition, expressed in joules per gram of material. The enthalpy of fusion is also sometimes called fusion capacity or specific heat capacity by a person skilled in the art.

The styrene block copolymer (or SBC) (constituent a)) that can be used in the adhesive composition according to the invention generally has a weight-average molecular weight $M_W$ comprised between 5 kDa and 500 kDa (determined by gel permeation chromatography—GPC—with polystyrene standard).

In this case, the styrenes content of the styrene block copolymer is generally, and preferably, comprised in a range from 10 to 50%, preferably from 10 to 33%.

A-B-A represents a block copolymer having a polystyrene-poly(ethylenebutylene)-polystyrene structure called SEBS.

The triblock copolymers comprised in the adhesive composition according to the invention preferably have a linear structure.

It is also possible to use a mixture of triblock copolymers and diblock copolymers having the same elastomeric block B, in particular because such mixtures are commercially available.

In such a case, the diblock copolymer content of the mixture of styrene block copolymers is generally comprised in a range from 0 to 80%, preferably from 0 to 40% by weight.

The preferred styrene block copolymer is SEBS available from Kraton Polymers (under the trade mark Kraton G®) or from Dynasol or Enichem.

As examples of commercial products having a linear SEBS structure there can be mentioned:
  Kraton® G1726 (comprising 70% diblock copolymer and 30% styrene unit);
  Kraton® G1652 (comprising 0% diblock copolymer and 30% styrene unit); and
  Kraton® G1657 (comprising 30% diblock copolymer and 13% styrene unit).

The styrene block copolymer (constituent a)) that can be used in the adhesive composition according to the invention is preferably a copolymer of the SEBS type, which can also contain moreover from 0 to 15%, preferably from 0 to 10%, of at least one SBC copolymer from a category other than a SEBS copolymer. Thus, constituent a) can contain up to 10 to 15% of at least one copolymer chosen from the group formed by the copolymers of the polystyrene-polyisoprene-polystyrene (SIS) type, the copolymers of the polystyrene-polyisoprene-polybutadiene-polystyrene (SIBS) type, the copolymers of the polystyrene-polybutadiene-polystyrene (SBS) type, and the copolymers of the polystyrene-poly(ethylene-propylene)-polystyrene (SEPS) type. For example constituent a) can contain from 10 to 15% of Vector® 4411 (copolymer of the SIS type comprising 0% diblock and 44% styrene).

The tackifying resin (constituent b)) that can be used in the adhesive composition according to the invention is usually commercially available, and chosen from the non-aromatic tackifying resins and/or the aromatic tackifying resins, usually chosen from the group formed by the tackifying resins belonging to category i) or ii) as follows and/or from the group of the tackifying resins belonging to category iii) as follows:

Resins i): the hydrocarbon resins with $C_5$ units such as Escorez® 1310 LC available from Exxon Chemicals; DCPD (dicyclopentadiene) hydrogenated resins such as Escorez® 5400 available from Exxon Chemicals; $C_9$ modified DCPD hydrogenated resins such as Escorez® 5600 available from Exxon Chemicals; modified $C_9$ hydrocarbon resins with $C_5$ units such as Wingtack® ET and Wingtack® Extra available from Cray Valley; hydrogenated resins with $C_5$ units such as Eastotac® H 100 W and Regalite® S1100 available from Eastman;

Resins ii): terpene resins such as Sylvares® TR7115, available from Arizona Chemicals;

Resins iii): the at least partially hydrogenated $C_9$ type aromatic resins, such as Norsolene® W80 available from Cray Valley; Norsolene® W85 available from Cray Valley; Norsolene® W100 available from Cray Valley; Kristallex® F80 available from Eastman; Kristallex® F100 available from Eastman; Piccotex™ 120 available from Eastman; Sylvares® SA85 available from Arizona Chemicals.

Therefore, the tackifying resin (constituent b)) that can be used in the composition according to the invention is a wax of type i) or ii) and/or a wax of type iii), i.e. either a wax of type i) or ii), or a wax of type iii), or a wax of type i) or ii) and a wax of type iii).

The $C_9$ type aromatic resin is generally obtained by polymerization of alpha methylstyrene, generally without the action of phenols, or by copolymerization of styrene and of alpha methylstyrene. It can be fully or partially hydrogenated.

The wax (constituent c)) that can be used in the adhesive composition according to the invention is typically and preferably a Fischer-Tropsch (or FT) wax, i.e. a synthetic wax produced by the Fischer-Tropsch method. The hydrocarbons thus synthesized are generally linear and fractionated into different grades of FT wax with chain lengths containing up to 100 carbon atoms per molecule, their classification being a function of their saturated linear chain. These hydrocarbons are generally free from aromatics, sulphur and nitrogen.

But more generally, the wax which can be used in the adhesive composition according to the invention is either a residue of by-products of the polymerization of ethylene or propene, or synthesized specifically via a specific polymerization, for example Ziegler-Natta or Fischer-Tropsch. The Sasolwax® or Paraflint® grades from Sasol, as well as the Polywax® grades from Baker Petrolite are particularly suitable for the invention.

The commercial waxes that can be used are Polywax® 500 and Sasolwax® H1 waxes from Baker Petrolite, as well as Paraflint® C80 wax from Sasol.

Constituent d) that can be used in the composition according to the invention is a polyethylene wax and/or a polyolefin polymerized by metallocene catalysis, i.e. either a polyethylene wax or a polyolefin polymerized by metallocene catalysis, or a polyethylene wax and a polyolefin polymerized by metallocene catalysis.

The polyolefin polymerized by metallocene catalysis is most usually chosen from the commercial products Affinity® PL 1280, Affinity® GA 1900, Affinity® GA 1950, Infuse® 9807 and Engage® 8407/8400 available from Dow Chemical.

The polyethylene wax (or polyethylene homopolymer) is for example such as a wax from the Honeywell AC® range, and in particular an AC® 6 grade wax and/or an AC® 8 grade wax.

The composition according to the invention can moreover comprise from 0 to 20% of at least one paraffinic wax, such as for example a paraffin wax having a melting point comprised within a range from 68-70° C., or a paraffin wax having a melting point approximately equal to 65° C., or a paraffin wax having a melting point comprised within a range from 58 to 60° C.

More generally, such a paraffin wax usually has a melting point of approximately 50° C. to approximately 80° C., the melting points being determined by the ASTM D 127-60 method.

The adhesive composition according to the invention can moreover contain from 0 to 7% of at least one amide wax. This amide wax generally has the formula:

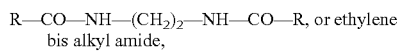

$R-CO-NH-(CH_2)_2-NH-CO-R$, or ethylene bis alkyl amide, where R is an alkyl comprising from 10 to 20 carbon atoms per molecule, preferably from 16 to 18 carbon atoms per molecule.

Among these amide waxes, there can be mentioned the steramides of formula $C_{18}H_{37}NO$. The Crodamide® commercial products such as for example Crodamide® ER, Crodamide® EBS and Crodamide® EBO, are amide waxes according to the invention.

The composition according to the invention can moreover comprise from 0 to 10% of at least one naphthene oil and/or paraffin oil such as for example Nyflex® 222B paraffin oil available from Nynas or Primal® 352 naphthene oil available from Esso.

In a preferred embodiment, the adhesive composition according to the invention comprises moreover at least one stabilizer and/or at least one antioxidant. The stabilizer is useful in the hot-melt composition according to the invention and is generally incorporated so as to help to protect the polymers present in this composition, and therefore the adhesive composition itself, from the effects of the thermal and oxidizing degradation which can occur during the production and application of the composition as a film, as well as during its usual exposure to the ambient environment. Such degradation is generally manifested by deterioration in the appearance, the physical properties and the performance characteristics of the composition. Any stabilizer and/or any antioxidant known to a person skilled in the art can be incorporated into the adhesive composition according to the invention. Among the preferred stabilizers, a particularly preferred stabilizer is Irganox® 1010, or pentaerythritol tetrakis((3,5-di-tert-butyl-4-hydroxyphenyl)propionate), produced by BASF.

The adhesive composition according to the present invention can be prepared by simply mixing its constituents at a temperature comprised within a range from 130 to 200° C., until a homogeneous mixture is obtained. The heated homogeneous mixture is then allowed to cool to ambient temperature and therefore to cure. The mixing techniques are well known to a person skilled in the art. It is also possible to prepare the adhesive composition industrially by using conventional techniques. These techniques comprise, by way of example, mixing by extrusion, with single-screw mixers or with twin-screw mixers. After production, the adhesive composition can be packaged in the form of tablets, beads or blocks, by using the conventional techniques.

The adhesive composition according to the invention can be easily characterized directly by different conventional analytical methods or after solubilization and/or semi-preparative liquid chromatography, followed by a fraction-by-fraction identification, such as DSC; infrared, mass or surface infrared spectroscopy, SEC (Steric Exclusion Chromatography), CDFS (Crystallinity-Driven Fictional SEC), or by NMR (Nuclear Magnetic Resonance).

After mixing, the composition according to the invention can be melted and co-extruded, with the hot-melt adhesive material to be coated, or it can be formed into a film by moulding or melted by extrusion, on a surface of the hot-melt adhesive product constituted by the hot-melt adhesive material.

The invention also relates to a film for hot-melt adhesive product constituted by at least one hot-melt adhesive material, said film being constituted by at least one composition according to the invention.

By "film", is meant according to the invention a rigid or semi-rigid or flexible or formable product, having a thickness in the range from 10 μm to 2 mm, preferably from 20 to 500 μm, and even more preferably from 25 to 300 μm.

The hot-melt adhesive material can be a hot-melt mastic (or sealant).

The invention also relates to a ready-to-use hot-melt adhesive product, comprising:
at least one hot-melt adhesive product constituted by at least one hot-melt adhesive material, and
at least one coating of the hot-melt adhesive product, the coating being constituted by a film according to the invention.

A hot-melt adhesive material is for example such as described in patent application WO 2006/050108.

A hot-melt mastic is for example the hot-melt mastic of the butyl type described in patent application WO 2006/037500.

The invention also relates to a method for the production of a ready-to-use hot-melt adhesive product, comprising at least one hot-melt adhesive product constituted by at least one hot-melt adhesive material, and at least one coating of the hot-melt adhesive product constituted by a film, said method being characterized in that it comprises a step of co-extrusion of a film of a composition according to the invention around the hot-melt adhesive product.

As explained, preferably, the adhesive composition according to the invention forms a film which is produced simultaneously with the hot-melt adhesive product, for example in a co-extrusion process. The hot-melt adhesive product is usually a thermoplastic composition of at least one hot-melt adhesive material, formed by combining at least one, preferably at least two ingredient(s). This composition generally has the property of softening and becoming mouldable when heated, and of hardening and becoming relatively rigid when cooled, preferably at ambient temperature, the degree of rigidity and of hardness varying greatly according to the nature of the composition. The thermoplastic composition is more generally any material which becomes or which remains flexible and can be moulded when it is subjected to heat and which becomes harder when cooled, even relatively rigid when cooled.

The hot-melt adhesive material is generally shaped by extrusion, co-extrusion, moulding and any specific technique known to a person skilled in the art, such as for example described in patent application WO 2006/050108 or patent application WO 2006/040194. It is called a hot-melt adhesive product once it has a geometrical form. The hot-melt adhesive product according to the invention is constituted by, preferably consists of, at least one hot-melt adhesive material. It is also possible for the adhesive composition according to the invention to wrap this hot-melt adhesive product using a manual coating method.

The ready-to-use hot-melt adhesive product, i.e. coated according to the invention, can be loaded directly into the melting tank of the machine for the application of said adhesive product, which makes it possible to avoid any waste and prevent possible loss of time.

Preferably, the hot-melt adhesive product is one of the HMPSAs used in an industrial context, in particular those typical of self-adhesive applications, tapes and labels. The most representative examples may be hot-melt adhesive products either from polymers of the styrene isoprene styrene (SIS) type, or from polymers of the styrene butadiene styrene (SBS) type. These products contain a large proportion of tackifying resins (between 30 and 70%), and a proportion of oil varying from 0% to 50% by mass. The viscosities of these HMPSA products are of the order of 1 to 100,000 mPa·s at 170° C.

But, more generally, the hot-melt adhesive material is any material of HMA ("Hot-Melt Adhesive") type that can be extruded and will be delivered in the form of self-protective sachet technology. An HMPSA composition constitutes a specific case thereof. But this hot-melt adhesive material can also contain copolymers of the SBC type, APAO, or EVA HMA bases, or acrylic or polyolefin bases obtained by metallocene catalysis, as is well known to a person skilled in the art.

Preferably, the hot-melt adhesive material can comprise at least one olefin polymer originating from Ziegler-Natta catalysis, such as for example the Vestoplast® grades of amorphous polyalphaolefins from Evonik, the Hyflex® grades from Bassel, or any olefin polymer originating from metallocene-type catalysis, such as for example Affinity®, Engage®, Versify®, Infuse® grades from Dow Chemical or Vistamax®, Exxact® from Exxon Mobil Chemical or Licocen® from Clariant, or LMPP® from Idemitsu. The majority monomer present in this olefin polymer is generally either ethylene or propene, and the minority monomers are generally ethylene, propene, butene, hexene and octene.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French Application No. 1162452, filed Dec. 26, 2011 are incorporated by reference herein.

EXAMPLES

The following examples illustrate the invention without thereby limiting the scope thereof.

Unless otherwise indicated, all percentages are given as weight/weight.

1. Protocols of the Experiments 1.1. Description of the Sachets Made Manually in the Laboratory Each of the sachets made manually in the laboratory, in order to carry out the experiments, was constituted by a hot-melt adhesive material. Each of these sachets was prepared simply by hot mixing according to the usual techniques, followed by hardening via cooling, then cutting out, from the hot-melt adhesive material thus constituted, a parallelepipedic rectangle of dimensions 1 cm×1 cm×8 cm=8 cm$^3$.

The three different hot-melt adhesive materials used in these experiments are described hereinafter:
1. 30% EVA copolymers with a vinyl acetate content comprised between 25 and 35%+55% pentaerythritol base rosin ester+15% of naphthenic mineral oil (material called MAT1).
2. 30% SIS copolymer with styrene content comprised between 12 and 20%+49% of $C_5/C_9$ tackifying resin+21% of naphthenic mineral oil (material called MAT2)
3. 35% SBS copolymer with a styrene content comprised between 25 and 32%+46% pentaerythritol base rosin ester+19% naphthenic mineral oil (material called MAT3).

Moreover a regular film 70 μm thick of the "skin" material (i.e. of hot-melt adhesive composition to be tested), is extruded using a flat extrusion die (or lipped nozzle) heated to 180° C., in the laboratory, supplied with molten material for example by a gear type pump, around the core of the sachet constituted by MAT1, MAT2 or MAT3 material. This film, when cooled, surrounds the core of the sachet, made from hot-melt adhesive material, to constitute its "skin". The ends are folded over cleanly several times in order to avoid leakage of hot-melt adhesive material over time under the effect of temperature and mechanical stresses.

1.2. Description of the Coated Sachets Produced by Industrial Tests on JPB S10 Machine On a machine of the JPB make, model S10, a co-extrusion of the hot-melt adhesive composition to be tested and the hot-melt adhesive material (MAT2 or MAT3) was carried out. An annular co-extrusion nozzle, of diameter approximately 4 cm, outputs molten coated sachets horizontally, directly into a water bath. The temperature of the water was between 2° C. and 8° C., the temperature of the "skin" material (i.e. the hot-melt adhesive composition to be tested) at the nozzle was between 160° C. and 220° C., and the temperature of the hot-melt adhesive material MAT2 or MAT3 was between 100 and 170° C. The pressure within the "skin" material circuit was of the order of 2 to 3 MPa. The temperature of the nozzle varied from 150 to 230° C. The flow rates were adjusted to have approximately 2% by mass of hot-melt adhesive composition (or "skin" material), comparative or according to the invention, with respect to the hot-melt adhesive material. The output co-extruded material was then nipped by a rotating element called an anvil which thus converts the continuous co-extruded material into separate segments, either completely or still partially attached together so that they can then be easily detached. The height of the anvil was approximately 10 cm, thickness 2 cm, and width 20 cm. The speed of rotation of the anvil was of the order of 600 to 700 mm/s at the periphery. Between the nozzle output and the anvil, i.e. approximately 20 cm into the water, guide rollers were placed which compressed the co-extrudate to a greater or lesser extent. They were adjusted for a linear speed of the order of 100 to 150 mm/s.

The sachets were then entrained in the flow of cooling fluid until it was possible to handle and store them for their subsequent use. Finally, the sachets each had a length of 12 to 16 cm, and each weighed between 250 and 350 grams. The estimate of the thickness of the "skin" material covering the sachet on the basis of 2% by mass over the covered surface was 170 grams per m², i.e. 150 to 200 µm approximately (according to the density).

The occurrence of bulges or warts (hot-melt adhesive material MAT2 or MAT3 coming through to the outside of the "skin") immediately after the extrusion was adjudged "good" if less than 5% of the sachets were malformed in this way. Moreover, the formation of sachets capable of being easily separated after nipping by the anvil was assessed "good" when less than 5% of the sachets remained attached together by their ends.

1.3. Description of the Caking Test Carried Out on Sachets Produced by Hand in the Laboratory Three layers of 3 sachets are stacked in a staggered arrangement, and the stack is placed in a ventilated oven for a period varying from a few hours to several days at 50° C., in a siliconized cardboard tray which allows the stack to be kept in place. The visual appearance and caking of the stack were noted by unstacking it by hand when cool (i.e. between two and four hours after leaving the oven).

1.4. Description of the Caking Test Carried Out on Sachets Originating from Industrial Tests on a JPB S10 Machine Four layers of sachets are stacked in a staggered arrangement, i.e. approximately 14 sachets in total, and the stack is placed in a ventilated oven for a period varying from a few hours to several days at 50° C., in a siliconized cardboard tray which allows the stack to be kept in place. The visual appearance and caking of the stack were noted by unstacking it by hand when cool (i.e. between two and four hours after leaving the oven).

2. Comparative Compositions 2.1. Comparative Composition 1 (C1)

The first comparative composition, C1, comprised 49% by weight of Vector® 44-11 which is a styrene block copolymer, 30% by weight of Piccotex™ 120 and 10% by weight of Nyflex® 222B oil, which is a paraffin oil, as well as 1% Irganox® 1010 preservative.

Such a composition had a viscosity at 180° C. of 41,000 mPa·s, a softening point of 65° C., and a modulus of elasticity G' at 60° C., as measured by rheological scanning test at a temperature of 250° C. to 10° C. at 10° C./min and at 10 rad/s, of $1.7 \times 10^5$ Pa. Such a composition moreover had an enthalpy of fusion DSC at 20° C./min of 17 J/g, and a point of intersection of the elastic and viscous moduli, by the same rheological test, equal to 61° C.

This composition C1 corresponded to the composition 1601-00A described in patent application WO 2006/050108, on page 47.

2.2. Comparative Composition 2 (C2):

The second comparative composition, C2, comprised 100% of an ethylene/vinyl acetate copolymer, Evatane® 18-150. According to the rheological test according to the invention, this composition had a modulus of elasticity at 60° C., G', equal to $6.7 \times 10^4$ Pa, and a point of intersection of the elastic and viscous moduli equal to 61.7° C. This composition moreover had a softening point of 97° C., a viscosity at 180° C. of 88,500 mPa·s and an enthalpy of fusion DSC at 20° C./min of 86.4 J/g.

This composition C2 corresponded to the composition Evatane® 18-150 described in patent application WO 2006/050108, on page 47.

2.3. Comparative Composition 3 (C3):

The third comparative composition, C3, contained 40% paraffin wax (68-70° C.), 20% Wingtack® ET (extra) tackifying resin, 39% of an ethylene/vinyl acetate copolymer Evatane® 28-06 and 1% Irganox® 1010 preservative.

This composition had a viscosity at 180° C. of 9,500 mPa·s, a softening point of 82° C., a enthalpy of fusion DSC at 20° C./min of 90 J/g and, by the rheological test according to the invention, a modulus of elasticity G', at 60° C., equal to $1.20 \times 10^5$ Pa, as well as a point of intersection of the elastic and viscous moduli equal to 62° C.

The composition C3 corresponded to the composition 1601-156D described in patent application WO 2006/050108 (Table 2a, page 45).

2.4. Comparative Composition 4 (C4):

The fourth comparative composition, C4, comprised 25% by weight of paraffin wax (58-60° C.), 24% by weight of Paraflint® C80 wax (which is a wax of the Fischer-Tropsch type having a melting point of 80 to 115° C., viscosity at 135° C. greater than 10 cP (with 1 cP=1 mPa·s) and number-average molecular weight of 600 to 1300 Da), 15% Lotryl® 15MA 03 ethylene/acrylate copolymer, 25% Affinity® PL 1280 polyolefin polymerized by metallocene catalysis, 10% by weight of Kraton® G 1657 styrene block copolymer and 1% by weight of Irganox® 1010.

Such a composition had a viscosity at 180° C. of 35,800 mPa·s, a softening point of 101° C. and, by rheological test according to the invention, a modulus of elasticity at 60° C., G', equal to $2.10 \times 10^5$ Pa, as well as a point of intersection of the elastic and viscous moduli at 72° C. Moreover, this composition had a DSC enthalpy at 20° C./min of 135 J/g.

The composition C3 corresponded to the composition 1601-62A described in patent application WO 2006/050108 (Table 1a, page 43).

3. Compositions According to the Invention:

The compositions according to the invention INV1, INV2, INV3 and INV4 were the following:

3.1. Composition According to the Invention 1 (INV1)

The composition INV1 contained 40% by weight Kraton® G 1657 styrene block copolymer (constituent a)), two tackifying resins (constituents b)), namely 7% by weight Norsolene® W85 and 17% by weight Eastotac® H100 W, 32% by weight of a Polywax® 500 wax (constituent c)), as well as 3% by weight of an AC® 8 polyethylene wax (constituent d)), as well as 1% by weight Irganox® 1010.

Said composition INV1 had a viscosity at 180° C. of 15,000 mPa·s, a softening point of 108° C. and, by rheological test according to the invention, a modulus of elasticity, G', at 60° C., of $5.8 \times 10^5$ Pa, and a point of intersection of the elastic and viscous moduli of 81.8° C. This composition INV1 had moreover a DSC enthalpy at 20° C./min of 61.2 J/g.

3.2 Composition According to the Invention 2 (INV2)

The composition INV2 contained 30% by weight Kraton® G 1657 styrene block copolymer (constituent a)), two tackifying resins (constituents b)), namely 7% by weight Norsolene® W85 and 7% by weight Eastotac® H100 W, 22% by weight of a Polywax® 500 wax (constituent c)), 3% by weight of an AC® 8 polyethylene wax (constituent d)), 30% by weight Affinity® GA 1900 polyolefin polymerized by metallocene catalyst (constituent d)) as well as 1% by weight Irganox® 1010.

Said composition INV2 had a viscosity at 180° C. of 17,400 mPa·s, a softening point of 116° C. and, by rheological test according to the invention, a modulus of elasticity, G', at 60° C., of 1.3×10⁶ Pa, and a point of intersection of the elastic and viscous moduli at 90.5° C. This composition INV2 had moreover an enthalpy of 65.1 J/g.

3.3 Composition According to the Invention 3 (INV3)

The composition INV3 contained 31% by weight Kraton® G 1657 styrene block copolymer (constituent a)), 7% by weight Escorez® 5600 tackifying resin (constituent b)), 26% by weight Polywax® 500 wax (constituent c)), 3% by weight AC® 8 polyethylene wax (constituent d)), 32% by weight Affinity® GA 1900 polyolefin polymerized by metallocene catalysis (constituent d)) as well as 1% by weight Irganox® 1010.

Said composition INV3 had a viscosity at 180° C. of 26,000 mPa·s, a softening point of 114° C., and by rheological test according to the invention, a modulus of elasticity, G', at 60° C., of 1.6×10⁶ Pa, and a point of intersection of the elastic and viscous moduli at 92° C. This composition INV3 had moreover an enthalpy of 62.1 J/g.

3.4 Composition According to the Invention 4 (INV4)

The composition INV4 contained 32% by weight Kraton® G 1657 styrene block copolymer (constituent a)), 7% by weight Escorez® 5600 tackifying resin (constituent b)), 27% by weight Paraflint® H1 wax (constituent c)), 32% by weight Affinity® GA 1900 polyolefin polymerized by metallocene catalysis (constituent d)) as well as 2% by weight of Irganox® 1010.

Said composition INV4 had a viscosity at 180° C. of 22,000 mPa·s, a softening point of 107° C., and by rheological test according to the invention, a modulus of elasticity, G', at 60° C., of 1.5×10⁶ Pa, and a point of intersection of the elastic and viscous moduli at 87° C. Said composition INV4 had moreover an enthalpy of 60.2 J/g.

The eight compositions are summarized in the following Table 1.

TABLE 1

| Composition | C1 (1601-00A) (comparative) | C2 (EVA 18-150) (comparative) | C3 (1601-156D) (comparative) | C4 (1601-162A) (comparative) |
|---|---|---|---|---|
| Styrene block copolymer | Vector ® 4411, 49% | — | — | Kraton ® G 1657, 10% |
| Aromatic tackifying resin | Piccotex ™ 120, 30% | — | — | — |
| Styrene tackifying resin | — | — | Wingtack ® ET, 20% | — |
| Wax | — | — | — | Paraflint ® C80, 24% |
| Polyolefin polymerized by metallocene catalyst | — | Evatane ® 18, 150, 100% | Evatane ® 28-06, 39% | Lotryl ® 15MA, 15%, + Affinity ® PL 1280, 25% |
| Polyethylene wax | — | — | — | — |
| Paraffin wax | Paraffin wax (65° C.), 10% | — | Paraffin wax (68-70° C.), 40% | Paraffin wax (58-60° C.), 25% |
| Naphthenic and/or paraffinic oil | Nyflex ® 222B, 10% | — | — | — |
| Preservative | Irganox ® 1010, 1% | — | Irganox ® 1010, 1% | Irganox ® 1010, 1% |

| Composition | INV1 (according to the invention) | INV2 (according to the invention) | INV3 (according to the invention) | INV4 (according to the invention) |
|---|---|---|---|---|
| Styrene block copolymer | Kraton ® G 1657, 40% (constituent a)) | Kraton ® G 1657, 30% (constituent a)) | Kraton ® G 1657, 31% (constituent a)) | Kraton ® G 1657, 32% (constituent a)) |
| Aromatic tackifying resin | Norsolene ® W85, 7% (constituent b)) | Norsolene ® W85, 7% (constituent b)) | — | — |
| Styrene tackifying resin | Eastotac ® H 100 W, 17% (constituent b)) | Eastotac ® H 100 W, 7% (constituent b)) | Escorez ® 5600, 7% (constituent b)) | Escorez ® 5600, 7% (constituent b)) |
| Wax | Polywax ® 500, 32% (constituent c)) | Polywax ® 500, 22% (constituent c)) | Polywax ® 500, 26% (constituent c)) | Paraflint ® H1, 27% (constituent c)) |
| Polyolefin polymerized by metallocene catalyst | — | Affinity ® GA 1900, 30% (constituent d)) | Affinity ® GA 1900, 32% (constituent d)) | Affinity ® GA 1900, 32% (constituent d)) |

TABLE 1-continued

| | | | | |
|---|---|---|---|---|
| Polyethylene wax | AC® 8 wax, 3% (constituent d)) | AC® 8 wax, 3% (constituent d)) | AC® 8 wax, 3% (constituent d)) | — |
| Paraffin wax | — | — | — | — |
| Naphthenic and/or paraffinic oil | — | — | — | — |
| Preservative | Irganox® 1010, 1% | Irganox® 1010, 1% | Irganox® 1010, 1% | Irganox® 1010, 2% |

4. Tests of Dissolution of the Hot-Melt Adhesive Compositions (Comparative and According to the Invention)

The different hot-melt adhesive compositions, comparative and according to the invention, were tested according to the same dissolution test carried out for each of these compositions, on each of the three hot-melt adhesive materials MAT1, MAT2 and MAT3. The dissolution test carried out was the following:

2% by mass of the hot-melt adhesive composition, comparative or according to the invention, was introduced in the form of film 70 μm thick, in 50 g of hot-melt adhesive material (MAT1, MAT2 or MAT3) at 170° C., into a heated aluminium crucible. It was left to stand for one hour, then stirred by hand with a glass rod for 3 minutes, at approximately 2 revolutions per minute. The final appearance of the product was noted.

Consequently, the comparative hot-melt adhesive compositions C2, C3 and C4 were not acceptable. On the other hand, the comparative hot-melt adhesive composition C1 and the hot-melt adhesive compositions INV1, INV2, INV3 and INV4 according to the invention were acceptable.

The results obtained are summarized in the following Table 2:

TABLE 2

| | C1 | C2 | C3 | C4 | INV1 | INV2 | INV3 | INV4 |
|---|---|---|---|---|---|---|---|---|
| MAT1 | 1 | 1 | 1 | 1 | 1 | 1 | 1 | 1 |
| MAT2 | 1 | 3 | 3 | 3 | 2 | 2 | 2 | 2 |
| MAT3 | 1 | 3 | 3 | 3 | 2 | 2 | 2 | 2 | in which
1 = transparent; homogeneity of the final product mix; acceptable;
2 = cloudy; semi-homogeneity of the final product mix; acceptable; and
3 = whitish; heterogeneity of the final product mix; unacceptable.

5. Observations During the Production of the Coated Sachets in Industrial Tests on JPB S10 Machine (cf. 1.2.)

In this example, the six hot-melt adhesive compositions were observed, during the production of sachets in which the core was constituted by hot-melt adhesive material MAT2 or MAT3, following two observation criteria:

Criterion I: avoidance of the formation of fluid bulges after a few meters, and

Criterion II: nipped elements easily separable during cooling.

The assessments are visual, carried out by the same operator, and are allocated according to two assessments: "good" or "bad".

The same results are obtained, whether the core of the sachets is constituted by MAT2 or MAT3 material. These results are summarized in the following Table 3.

TABLE 3

| | C1 | C2 | C3 | C4 | INV1 | INV2 | INV3 | INV4 |
|---|---|---|---|---|---|---|---|---|
| Observation I | — | B | — | B | G | G | G | G |
| Observation II | — | G | — | B | G | G | G | G | in which
G = Good; acceptable;
B = Bad: unacceptable homogeneity; and
"—" = Not determined.

The comparative compositions C2 and C4 were not acceptable, in the light of their results.

Thus, these data make it possible to demonstrate that the compositions INV1, INV, INV3 and INV4 according to the invention could be used as "skin" material on sachets constituted by MAT2 or MAT3 material, in an industrial production method.

In fact, the use of hot-melt adhesive compositions INV1, INV2, INV3 and INV4 was considered good, i.e. that less than 5% of the sachets were malformed. Similarly, the formation of sachets capable of being separated easily using of these compositions INV1, INV2, INV3 and INV4 was considered good, i.e. less than 5% of the sachets remained attached together by their ends.

6. Caking Tests Carried Out on Sachets Produced by Hand in the Laboratory (cf. 1.3).

In this example, the tests were carried out on the two different adhesive materials MAT2 and MAT3.

For each material MAT2 or MAT3, the results of the tests of the present example were carried out by observation and handling, either after 24 hours at 50° C. (period P1), or after 7 continuous days at 50° C. (period P2).

The criteria were the following, from the most favourable to the least favourable:

****: non-tacky material; acceptable;

***: sachet detached by hand without destruction; acceptable;

**: material sticking; unacceptable;

*: sachet cannot be unstuck without destruction; unacceptable.

The results are summarized in the following Table 4:

TABLE 4

| | | C1 | C2 | C3 | C4 | INV1 | INV2 | INV3 | INV4 |
|---|---|---|---|---|---|---|---|---|---|
| MAT2 | P1 | * | *** | * | — | **** | **** | **** | **** |
| | P2 | * | * | * | — | *** | *** | *** | *** |
| MAT3 | P1 | — | ** | * | — | **** | **** | *** | *** |
| | P2 | — | * | * | — | ○ | ○ | ○ | ○ |
| | | | | | | ** |  |  | ** | in which
○ = caked and not sticking; and
"—" = not determined.

It was therefore noted that only the compositions according to the invention successfully performed the caking tests of the sachets produced by hand in the laboratory.

7. Caking Tests Carried Out on Sachets Originating from Industrial Tests on JPB S10 Machine (cf. 1.4.)

Caking tests of the six compositions, comparative and according to the invention, were repeated with hot-melt adhesive material MAT2 or MAT3. The criteria (**, *, **, *) were similar to those of Example 5.

The results are summarized in the following Table 5:

TABLE 5

|  |  | C1 | C2 | C3 | C4 | INV1 | INV2 | INV3 | INV4 |
|---|---|---|---|---|---|---|---|---|---|
| MAT2 | P1 | — | *** | — | — | **** | **** | **** | **** |
|  | P2 | — | * | — | — | *** | *** | *** | *** |
| MAT3 | P1 | — | — | — | *** | **** | **** | **** | **** |
|  | P2 | — | — | — | * | ○  | ○  | ○  | ○ ** | in which
○ = caked and not sticking; and
"—" = not determined.

It was therefore noted that the hot-melt adhesive compositions INV1, INV2, INV3 and INV4 according to the invention successfully performed this test, and were therefore particularly useful from the standpoint of industrial use.

CONCLUSION

The hot-melt adhesive compositions INV1, INV2, INV3 and INV4 according to the invention successfully performed the tests in the laboratory and in an industrial environment (Examples 3 to 6).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Hot-melt adhesive composition intended to form a film, the composition comprising, by weight with respect to the total weight of the composition:
   a) from 20 to 60% of at least one styrene block copolymer, chosen from the group formed by the triblock copolymers of formula A-B-A in which A represents a non-elastomeric styrene block (or polystyrene) and B represents a totally or partially hydrogenated polybutadiene elastomeric block, the diblock copolymers of formula A-B in which A and B are as defined previously, and their mixtures;
   b) from 5 to 55% of at least one tackifying resin having a number-average molecular weight comprised between 200 Da and 10 kDa (determined by gel permeation chromatography—GPC—with polystyrene standard), and chosen from the group formed by the resins capable of being obtained:
      i) by hydrogenation, polymerization or copolymerization (with or without aromatic hydrocarbon) from mixtures of unsaturated aliphatic hydrocarbons having approximately 5 or 9 carbon atoms, and originating from petroleum cuts, and
      ii) by polymerisation of terpenic hydrocarbons in the presence of Friedel-Crafts catalysts, and
      iii) by polymerization, followed optionally by at least partial hydrogenation, of alpha methylstyrene units and optionally styrene;
   c) from 10 to 40% of at least one wax having a melting point from 75 to 125° C. and a number-average molecular weight from 500 to 1500 Da (determined by gel permeation chromatography—GPC—with polystyrene standard); and
   d) from 1 to 30% of at least one constituent chosen from polyethylene waxes and polyolefins polymerized by metallocene catalysis;
   said composition having a Brookfield viscosity at 180° C. comprised within a range from 3,000 to 70,000 mPa·s, a softening point comprised within a range from 80 to 130° C. and a modulus of elasticity at 60° C., comprised within a range from $2 \times 10^5$ to $10^8$ Pa, as measured by rheological scanning test at a temperature from 150° C. to 10° C. at 10° C./min and at the constant oscillation frequency of 10 rad/s.

2. Composition according to claim 1, such that it has an intersection point of the moduli of elasticity and viscosity by rheological scanning test at a temperature of 150 to 10° C. at 10° C./min and at the constant oscillation frequency of 10 rad/s, comprised within a range from 70 to 100° C.

3. Composition according to claim 1, such that it has moreover a DSC enthalpy of fusion comprised within the range from 40 to 100 J/g.

4. Composition according to claim 1, such that constituent a) has a weight-average molecular weight $M_W$ comprised between 5 kDa and 500 kDa (determined by gel permeation chromatography—GPC—with polystyrene standard), and a styrenes content of the styrene block copolymer generally comprised within a range from 10 to 50%.

5. Composition according to claim 1, such that constituent a) is a mixture of diblock copolymers and triblock copolymers having the same elastomeric block B, the content of diblock copolymers in the mixture of styrene block copolymers being comprised within a range from 0 to 80%.

6. Composition according to claim 1, such that constituent a) is a SEBS type copolymer.

7. Composition according to claim 6, such that constituent a) contains moreover from 0 to 15% of at least one SBC copolymer from a category other than SEBS copolymer.

8. Composition according to claim 1, such that the tackifying resin is chosen from the group formed by the tackifying resins belonging to the following category i) or ii) and/or from the group of tackifying resins belonging to the following category iii):
   i) hydrocarbon resins with $C_5$ units; DCPD (dicyclopentadiene) hydrogenated resins; $C_9$ modified DCPD hydrogenated resins; $C_9$-modified hydrocarbon resins with $C_5$ units; hydrogenated resins with $C_5$ units;
   ii) Terpene resins;
   iii) The at least partially hydrogenated $C_9$ type aromatic resins.

9. Composition according to claim 1, such that constituent a) is a Fischer-Tropsch type wax.

10. Composition according to claim 1, characterized in that it comprises moreover from 0 to 20% of at least one paraffin wax.

11. Composition according to claim 1, characterized in that it comprises moreover from 0 to 7% of at least one amide wax.

12. Composition according to claim 1, comprising moreover from 0 to 10% of at least one naphthenic and/or paraffinic oil.

13. Film for hot-melt adhesive product constituted by at least one hot-melt adhesive material, said film being constituted by at least one composition according to claim 1.

14. Ready-to-use hot-melt adhesive product comprising:
at least one hot-melt adhesive product constituted by at least one hot-melt adhesive material, and
at least one coating of the hot-melt adhesive product, the coating being constituted by a film according to claim 13.

15. Method for the production of a ready-to-use hot-melt adhesive product, comprising at least one hot-melt adhesive product constituted by at least one hot-melt adhesive material, and at least one coating of the hot-melt adhesive product constituted by a film, said method being characterized in that it comprises a step of co-extrusion of a film of a composition according to claim 1 around the hot-melt adhesive product.

\* \* \* \* \*